United States Patent Office 2,990,694
Patented July 4, 1961

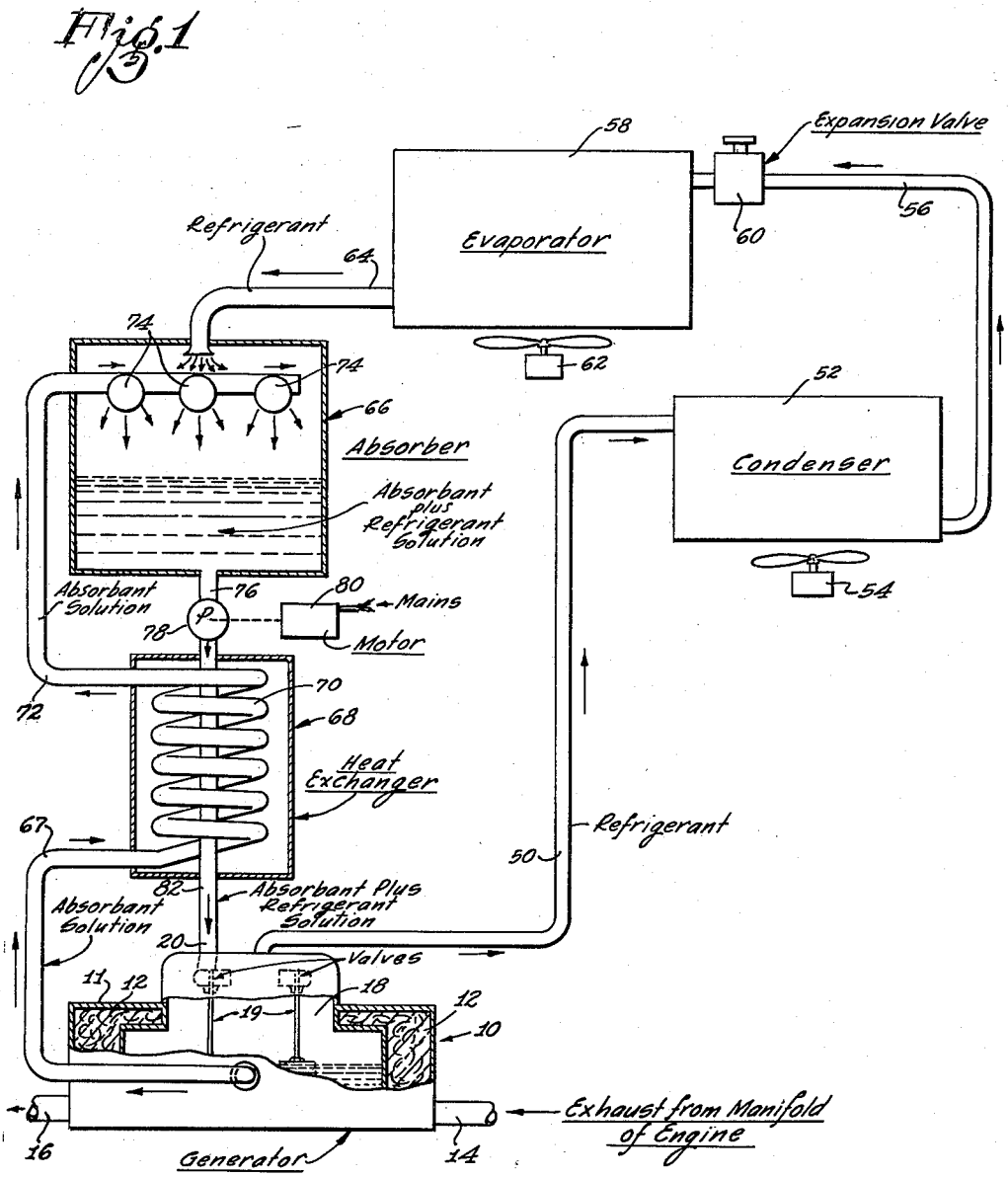

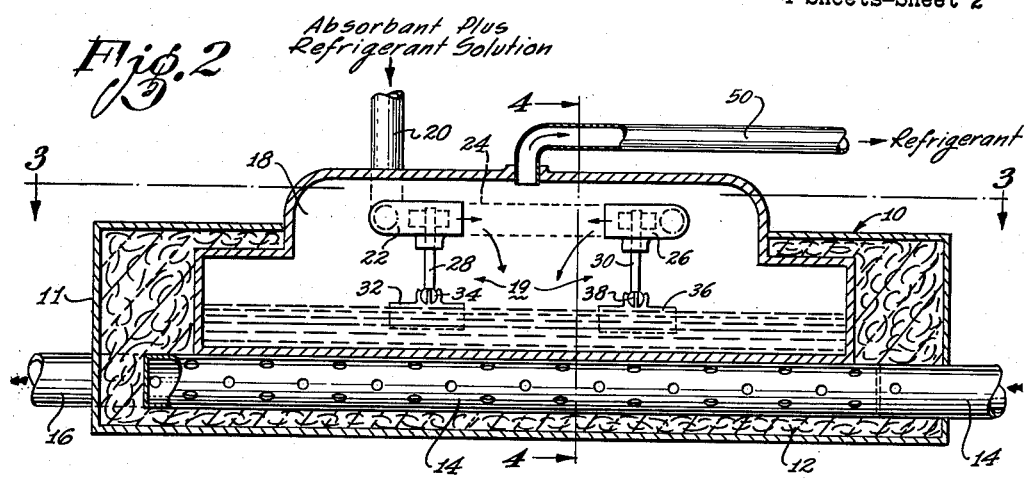
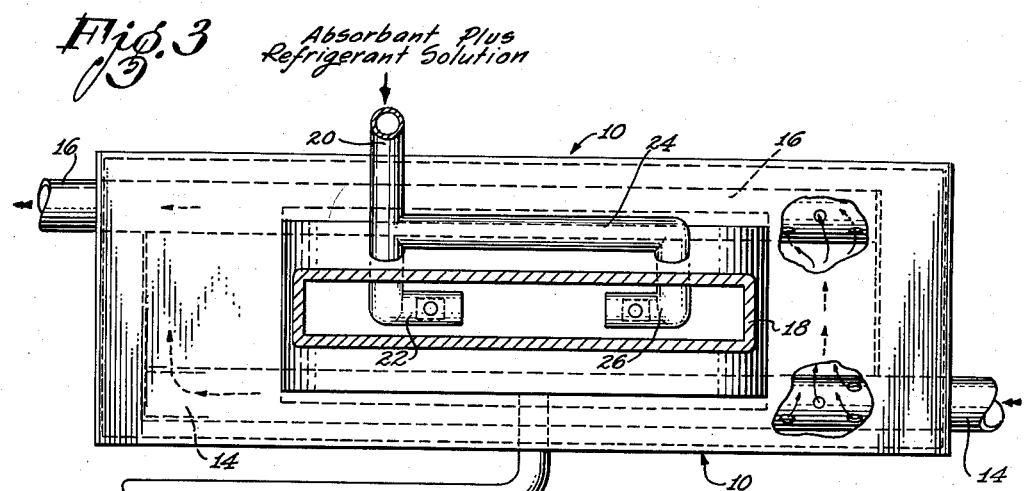
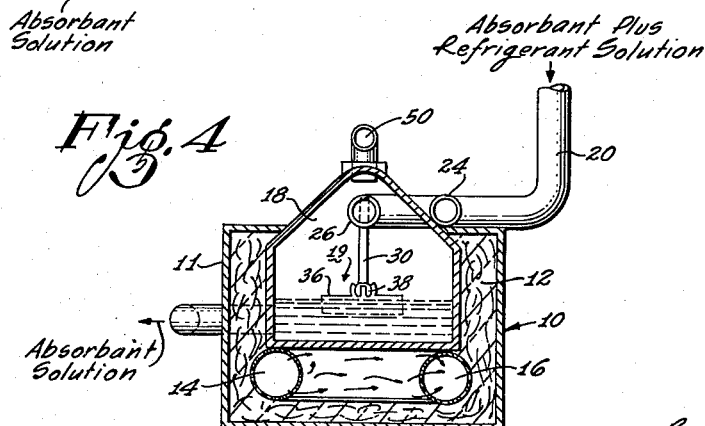

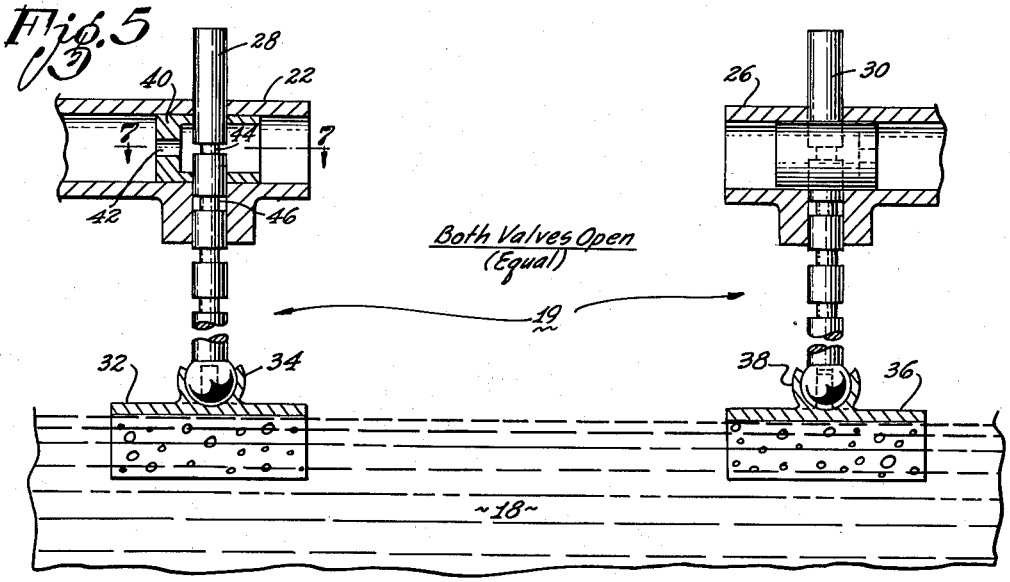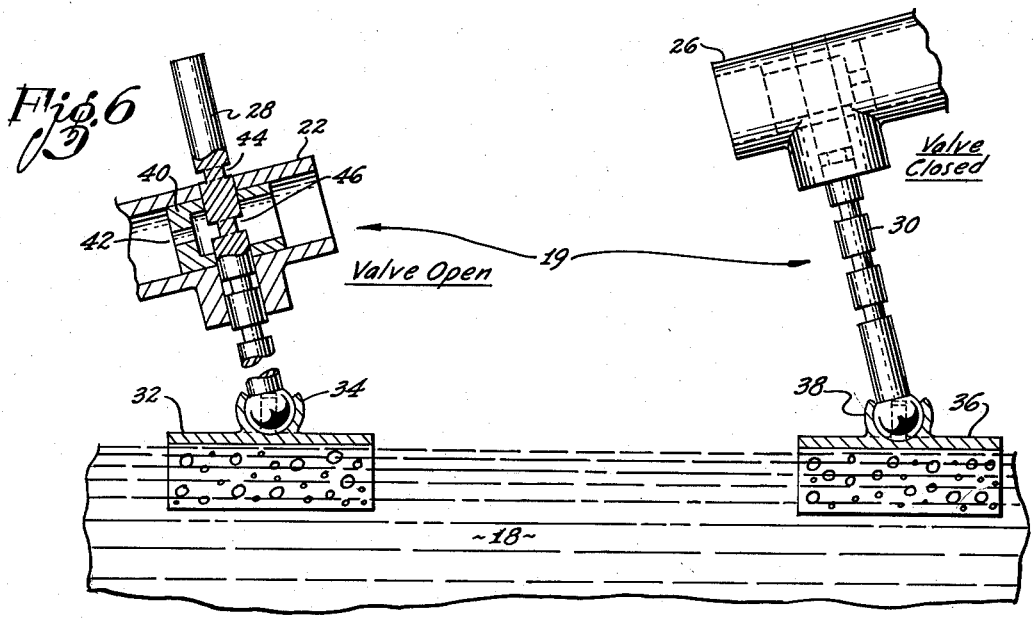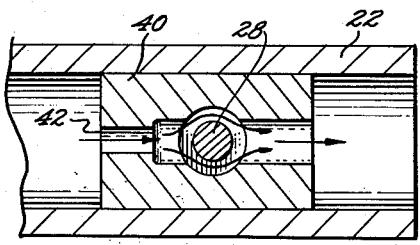

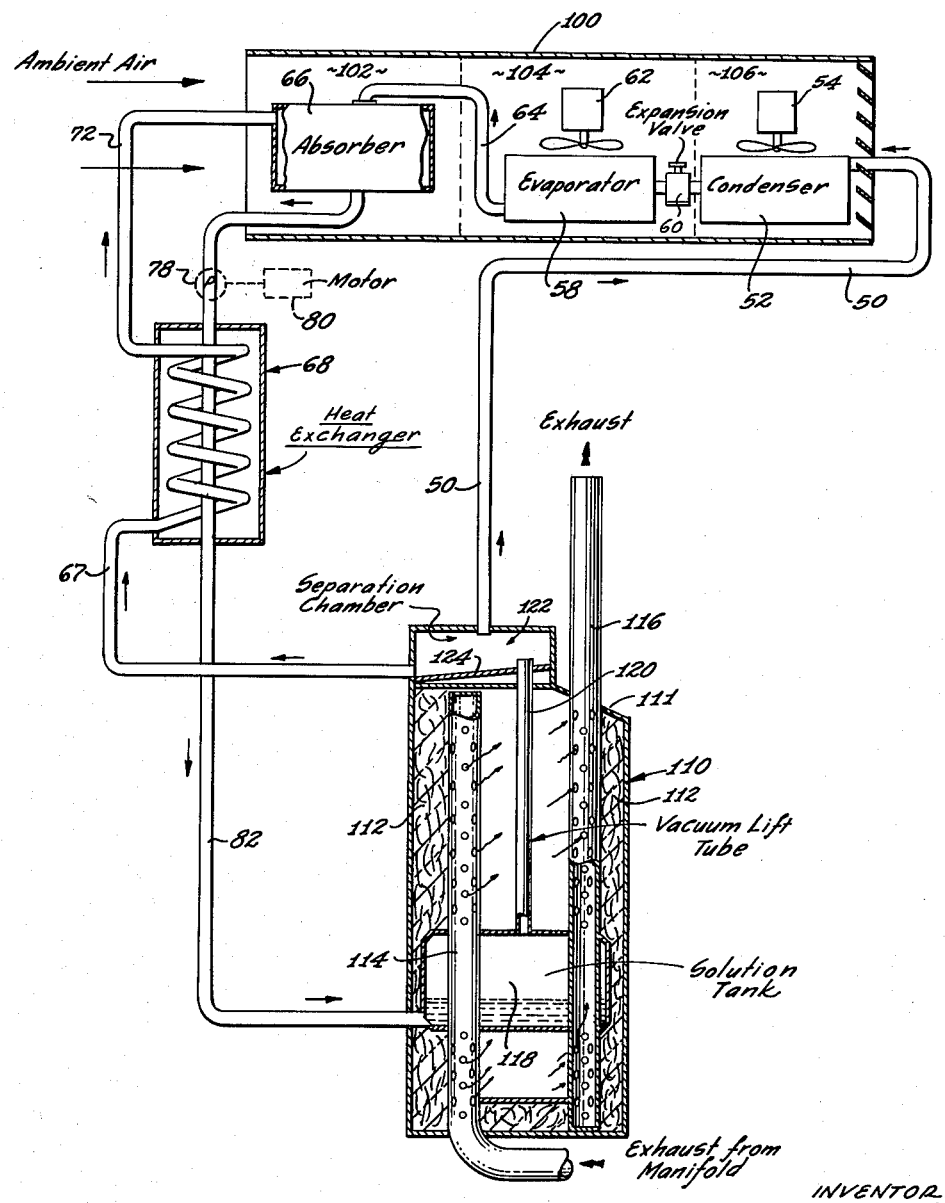

2,990,694
REFRIGERATION APPARATUS
Carl K. Kummerlowe, 7301 E. Granada Road, Scottsdale, Ariz., and Joseph E. Batie, 5707 N. 18th Place, Phoenix, Ariz., assignors of one-third to Frank Bruce, Gardena, Calif.
Filed July 10, 1958, Ser. No. 747,676
10 Claims. (Cl. 62—141)

The present invention relates to an improved absorption type of refrigeration system and apparatus, in which refrigeration is achieved by evaporating a liquid to produce a compressed vapor, the vapor being subsequently condensed and expanded to produce the desired refrigeration effect.

The invention is more particularly concerned with improved absorption type of refrigeration systems and apparatuses for use on a motor vehicle, and in which the heat extracted from the exhaust system of an internal combustion engine, or the like, is used for refrigeration purposes.

Motor vehicles, such as automobiles, trucks, buses and aircraft, derive their motive power almost exclusively from internal combustion engines. However, the internal combustion engines used in most motor vehicles have a thermal efficiency of the order of 25%. This means that about 75% of the heat from the gasoline consumed by the engine is lost. It is a known fact that approximately 40% of this heat escapes from the exhaust of the engine. For example, with a 100 H.P. engine during normal operation of the motor vehicle, between 40,000 and 50,000 B.t.u./hour are available for recovery from the exhaust system. Since only approximately 12,000 B.t.u./hour are required to produce one ton of refrigeration, it is possible to provide a three-four ton capacity refrigeration unit by using the exhaust gas heat of a typical 100 H.P. internal combustion engine of a motor vehicle.

The usual absorption refrigeration system includes as its basic components a generator or boiler, a condenser, an evaporator, and an absorber. Two solutions are typically used in a usual refrigeration system of this general type, one solution acting as the refrigerant and the other as the absorbent. For example, ammonia and water may be used in this respect, with the ammonia serving as the refrigerant and with the water serving as the absorbent.

There are two distinct circulation paths in the typical absorbent type of refrigeration system, one involving the refrigerant and the other the absorbent. The refrigerant is evaporated in the generator, and separated in the generator from the absorbent by the application of heat. The vaporized refrigerant then flows from the generator to the condenser in the usual absorption refrigeration system; and it is partially or fully condensed to a liquid in the condenser. The liquid refrigerant from the condenser is then passed through an expansion valve into the evaporator where it evaporates and creates refrigeration. The vaporized refrigerant from the evaporator then enters the absorber where it mixes with a solution of the absorbent.

The absorbent solution absorbs the vaporized refrigerant to form an absorbent/refrigerant solution, and the solution is pumped to the generator. In the generator, the heat applied vaporizes the refrigerant out of the solution, as noted above. The absorbent solution remaining in the generator is forced out of the generator by the vapor pressure, and the absorbent solution is circulated back into the absorber.

The present invention, as mentioned above, provides an improved type of absorption refrigeration system and apparatus which is primarily intended for use on motor vehicles and which uses the heat of the exhaust gases of the internal combustion engine of the motor vehicle to vaporize the refrigerant in the generator and drive it out of the absorbent and to the condenser. An important object of the invention is to provide such an improved refrigeration system which may be easily and inexpensively constructed and which operates efficiently and economically to perform its refrigerating function.

The improved apparatus and system of the invention utilizes in one embodiment an improved absorber unit. This improved absorber unit includes a compact housing with inlet lines for the vaporized refrigerant from the evaporator and for the absorbent solution from the generator. The housing also includes an outlet for the resulting solution of the absorbent and refrigerant.

The absorber unit in the particular embodiment of the invention uses spray coils in the upper part of its housing. These spray coils are coupled to the absorbent solution inlet, and they are used for the injection of the absorbent solution into the absorber. The vaporized refrigerant from the evaporator passes over these spray coils and it is effectively intermixed with the absorbent as the latter is sprayed into the absorber. The absorbent/refrigeration solution is then pumped from the bottom of the absorber housing through a heat exchanger to the generator.

The generator in a preferred embodiment of the invention is a combined muffler-generator unit. This combined unit enables the apparatus of the invention to be installed in existing motor vehicles in a relatively simple manner. It is merely necessary to remove the existing muffler of the internal combustion engine of the vehicle, and to replace it with the combined muffler-generator of the invention. As will be described, the improved muffler-generator unit functions not only to perform its vaporizing/separating function in the absorbent refrigerating apparatus of the invention, but it also serves to effectively muffle the internal combustion engine of the motor vehicle.

The generator-muffler unit referred to in the preceding paragraph includes, in a particular embodiment, a perforated inlet pipe having a closed inner end. This inlet pipe is intended to receive the exhaust gases from the vehicle's internal combustion engine. This inlet pipe is mounted in the generator-muffler unit in parallel spaced relationship with a perforated exhaust pipe. The assembly is supported in an external housing with sound-absorbing material, such as fibre glass, being contained within the housing.

The hot exhaust gases from the inlet pipe pass through its perforations and in through corresponding perforations in the exhaust pipe into the exhaust pipe to be exhausted. A solution tank for the absorbent-refrigerant solution is supported within the housing and over the path of the exhaust gases in heat-exchange relation with these gases, as they pass through the housing from the inlet pipe to the exhaust pipe. Heat from the gases passing between the inlet and exhaust pipe is absorbed by the solution in the solution tank, so that the refrigerant may be vaporized out of the solution and forced into the condenser.

The absorbent-refrigerant solution is pumped from the absorber into the solution tank in the embodiment of the invention presently being discussed through two ports which are located above the liquid level line of the solution tank. A double float system is included in the solution tank to provide for a substantially constant flow of absorbent-refrigerant solution into the tank regardless of the positioning of the motor vehicle with respect to the horizontal. This provides for an essentially constant level of solution in the tank regardless of whether the vehicle is horizontal, or at an inclination to the horizon.

In the drawings:

FIGURE 1 is a schematic representation, partly in block form, of an absorption type of refrigeration system and apparatus incorporating the concepts of the present invention, this figure showing several of the units of the apparatus in sectional form to indicate the various components and elements by which the improved operation and features of the invention are realized;

FIGURE 2 is a sectional view of a generator unit utilized in the apparatus of FIGURE 1 and on an enlarged scale with respect to FIGURE 1; this latter view showing in greater detail the double float system which controls the flow of solution into the solution tank of the unit, and also the manner in which the hot exhaust gases are muffled and how they are used to provide heat for the solution in the solution tank;

FIGURE 3 is another view of the generator unit of FIGURE 2 taken substantially on the line 3—3 of FIGURE 2, this latter view showing more clearly the manner in which a perforated inlet pipe is positioned in the housing of the unit in spaced parallel relationship with a perforated outlet pipe so that hot exhaust gases from the inlet pipe may be passed through the housing to be muffled and also to introduce some of their heat to the absorbent-refrigerant solution in the solution tank of the unit;

FIGURE 4 is a sectional view of the generator unit substantially on the line 4—4 of FIGURE 2, the latter view showing clearly the disposition of the inlet and outlet pipes, and their relation with the solution tank;

FIGURES 5 and 6 are enlarged schematic representations of the double valve system which is mounted in the solution tank of the generator unit, this valve system operating to provide an essentially constant flow of solution into the tank regardless of the inclination of the vehicle in which the apparatus is installed;

FIGURE 7 is a sectional view taken along the line 7—7 of FIGURE 5 to show the action of one of a pair of valves controlled by corresponding floats in the double float system of FIGURES 5 and 6; and FIGURE 8 is a view, partly in section and partly in block form, representing a second embodiment of the invention.

The absorption refrigeration system of FIGURE 1 includes a muffler-generator unit 10. This unit includes a housing 11 which has a quantity of sound-absorbing material 12 disposed in it. This sound-absorbing material may, for example, be fibre glass.

A perforated inlet pipe 14 having a closed inner end is mounted in the housing 11 and extends into the housing. This pipe is adapted to be coupled to the usual exhaust manifold of the internal combustion engine of the motor vehicle in which the apparatus is installed. A perforated outlet pipe, which also has a closed end, and which is designated 16, is also mounted in the housing 11 extends out of the housing. The pipe 16 is mounted in the housing 11 in spaced parallel relationship with the pipe 14, and its is adapted to receive the hot gases from the pipe 14. These hot gases pass out through the perforations in the inlet pipe 14, through the housing 11, and enter the exhaust pipe 16 through its perforations. The disposition of the pipes 14 and 16 is best shown in FIGURES 2, 3 and 4.

The generator-muffler unit 10 includes a solution tank 18 which is supported in the housing 11 over the path of, and in heat exchanging relationship with, the hot gases passing from the inlet pipe 14 to the exhaust pipe 16. This relationship of the solution tank 18 with the path of the hot gases in the housing 11 is best shown in FIGURE 4.

A double float system 19 is mounted in the solution tank 18 for controlling the flow of solution into the tank so as to provide for a substantially constant amount of solution in the tank regardless of the up-grade or down-grade position of the vehicle. This double float system 19 includes an inlet pipeline 20 which extends through the top of the solution tank. As best shown in FIGURES 2 and 3, for example, the input pipeline 20 extends into the solution tank 18, and it has a first end portion 22 which extends within the tank at essentially right angles to the pipeline itself. The pipeline 20 also has a branch 24 (FIGURE 3) which extends from it and which enters the tank 18 at a different point. The branch portion 24 also has an end portion which is designated 26, and this latter end portion is disposed within the tank 18 in axial alignment with the end portion 22.

The end portion 22 of the pipeline 20 supports a slidable valve stem 28, and the end portion 26 supports a slidable valve stem 30 (see particularly FIGURES 5, 6 and 7). A first float member 32 is pivotally mounted on the lower end of the valve stem 28 by means, for example, of a universal joint 34. In like manner, a float member 36 is pivotally mounted to the lower end of the valve stem 30 by means of a universal joint 38.

As best shown in FIGURES 5, 6 and 7, the end portion 22 of the pipeline 20 includes a cylindrical fitting 40. The cylindrical fitting is open at its downstream end, and it has a closed end with a central aperture 42 at its upstream end. The valve stem 28 extends through the cylindrical fitting 40. The valve stem has a plurality of axial portions having a restricted diameter, two of these portions being designated as 44 and 46 respectively.

As the float 32 moves up and down due to the rise and fall of the solution level in the solution tank 18, the restricted portion 44 of the valve stem 38, for example, moves up and down in the fitting 40 to control the passage of solution through the fitting. The relative dimensions of the valve stem 28 and of the fitting 40 are such that when no restricted portion of the valve stem 28 is in the fitting, the flow of fluid through the fitting is arrested. Then, as more and more of the restricted portion 44 extends into the fitting 40, the flow of solution through the fitting is increased. Conversely, when the float 32 drops so that less and less of the restricted portion 44 extends into the fitting 40, the flow of solution through the fitting is decreased.

As shown, for example, in FIGURE 5 when the vehicle is traveling with an essentially horizontal inclination, the valve stems 28 and 30 extend essentially vertically, and both the end portion 22 of the pipeline 20 and the end portion 26 of the branch line 24 are disposed on an essentially horizontal axis and are approximately the same distance from the level of the solution in the tank. Under these conditions, the restriction 44 of the valve stem 28 is normally moved in and out of the fitting 40, and a corresponding restriction of the valve stem 30 is moved in and out of a similar fitting in the end portion 26.

The valve stems 28 and 30 move together under the conditions outlined above, so that the level of the solution in the tank rises until both the restricted portion 44 and the corresponding restriction of the valve stem 30 are moved up out of the respective fittings. Then, for a drop in the level of the solution in the tank, both the restricted portions move down into their fittings so that a replenishing flow of solution passes through both the end portions 22 and 26. In this manner, so long as the vehicle is at an essentially horizontal inclination, both the valve stems 28 and 30 cooperate to maintain a preselected level of solution in the tank.

However, should the inclination of the vehicle change so that the level of the solution in the tank is as shown in FIGURE 6, both the floats 32 and 36 pivot on their valve stems, and the end portion 22 of the pipeline 20 is nearer the desired level of the solution in the tank 18 than the end portion 26 of the branch 24. Under these latter conditions, the valve stem 30 is moved down by the drop of its float 36 to completely shut off the end portion 26, the restricted portion 44 of the valve stem 28 is moved up out of the fitting 40, and the restricted portion 46 of the valve stem 28 is moved up into the fitting 40. This latter restricted portion 46 has substantially twice the axial length of the restriction 44 so that when it is disposed in the fittting 40, double the flow of solution passes through the fitting as was the case when the control was by the portion 44.

Therefore, under the conditions of FIGURE 6, the full control of solution into the tank 18 is by the valve stem 28, with double the amount flowing into the tank, when replenishment is required. The valve stem 28, therefore, operates on a new apparent level of fluid in the tank due to its inclination to maintain substantially the same amount of flow of solution into the tank 18 as was maintained when the vehicle was horizontal, as was the case in the view of FIGURE 5.

In like manner, when the vehicle assumes the opposite inclination to that shown in FIGURE 6, the valve stem 30 serves to control the solution level, and the valve stem 28 is shut off. For intermediate inclinations, both the valve stems 28 and 30 cooperate to maintain the selected amount of solution in the tank, with the cooperation being proportional and dependent upon the inclination of the vehicle.

In the manner described above, the double float system of FIGURES 5, 6 and 7 serves to maintain a substantially constant flow of solution into the tank 18, and to maintain an essentially constant amount of solution in the tank, regardless of the up-grade or down-grade inclination of the vehicle.

The solution tank 18 has an outlet pipeline 50 which couples it to a condenser 52 and which introduces vaporized refrigerant to the condenser. The condenser 52 may be of any known construction, and it cooperates with a fan 54 at least partially to condense the vaporized refrigerant.

A pipeline 56 couples the condenser 52 to an evaporator 58, and an expansion valve 60 is interposed in the pipeline 56. The expansion valve 60, and the evaporator 58 are of usual construction, and the condensed refrigerant is evaporated in the evaporator to produce the refrigerating effect. The evaporator may have a circulating fan 62 associated with it.

The vaporized refrigerant from the evaporator 58 is introduced through a pipe 64 through the top of an absorber unit 66. The solution tank 18 of the generator-muffler unit 10 has an exhaust pipe 67 for the absorbent solution in the tank 18 after the refrigerant has been vaporized out of it. The pipeline 67 extends to a heat exchanger 68 and couples with a coil 70 in the heat exchanger. The heat exchanger has an outlet pipe 72 which, in turn, couples with a plurality of spray coils 74 in the absorber unit 66. The spray coils 74 serve to introduce the absorbent into the absorber unit in spray form so as to permit the vaporized refrigerant from the evaporator 58 to be intimately mixed and absorbed by the absorbent in the absorber unit.

The absorber unit has an outlet pipeline 76 which extends to a pump 78. The pump is driven by a usual electric motor 80, and its outlet is coupled to an inlet to the heat exchanger 68. The heat exchanger also has an outlet 82 which couples with the pipeline 20 which extends to the valve system of the solution tank 18.

As mentioned previously, the apparatus and system of FIGURE 1 uses two different fluids, each of which is intended to perform a different operation and function. One of these fluids is the refrigerant, and it is expanded in the system to provide the desired refrigeration effects. The other fluid is the absorbent, and it serves to absorb the vaporized refrigerant and carry it to the generator-muffler unit 10.

Many refrigerant-absorbent combinations are suitable for use in this type of system. Examples of these are as follows:

| Refrigerant | Absorbent |
|---|---|
| Ammonia | Water. |
| Water | Lithium bromide. |
| Methylene chloride | Dimethyl ether or tetraethylene glycol. |
| Freon-12 | Ethyl ether of diethylene glycol acetate. |

Generally the apparatus of FIGURE 1 may be considered to have two distinct flow circuits. One of these may be referred to as the refrigerant circuit, and the other may be referred to as the absorbent circuit. In the refrigerant circuit, the refrigerant is separated from the absorbent and evaporated into a vapor in the solution tank 18 of the generator-muffler unit 10. This evaporation and separation of the refrigerant is due to the heat obtained from the exhaust gases flowing through the generator-muffler unit.

The vaporized refrigerant then flows through the pipeline 50 to the condenser 52 where it is condensed back to a liquid. This liquid, usually with some vapor still present, then passes through the expansion valve 60 into the evaporator 58. The refrigerant is evaporated in the evaporator 58 at its low partial pressure thereby creating the desired refrigeration effect.

From the evaporator 58, the refrigerant passes through the pipeline 64 in vaporized form and passes into the absorber unit 66. As the refrigerant passes into the absorber unit 66, it passes through the absorbent spray and is intimately mixed and absorbed by the absorbent. The resulting absorbent plus refrigerant solution is pumped through the heater exchanger 68 into the solution tank 18 of the generator-muffler unit 10. In the generator-muffler unit, the heat applied by the exhaust gases drives the refrigerant out of the solution and back to the condenser 52 where the refrigerant cycle repeats itself.

In the absorbent circuit, the absorbent solution remaining in the generator-muffler unit 10 after the refrigerant is vaporized is forced by the vapor pressure in the solution tank 18 out of the pipeline 67 and through the heat exchanger 78 to the pipeline 72. The latter pipeline introduces the absorbent solution to the spray coils 74 so that it enters the absorber unit in spray form and absorbs the incoming refrigerant in the described manner.

As illustrated, the pipeline 50 extends from an upper portion of the solution tank 18 so that the refrigerant vapor may pass through that pipeline to the condenser 52. The pipeline 67, on the other hand, is disposed below the liquid level in the solution tank 18 so that the liquid absorbent solution may be forced through the latter pipeline to the absorber unit 66.

As described above, the combination generator-muffler unit 10 not only muffles the exhaust gases passing from the engine of the vehicle, but also provides the necessary heat to vaporize the refrigerant and separate the refrigerant from the absorbent. Engine exhaust gases pass through the generator unit, and heat from the gases passing between the inlet and outlet pipes is absorbed by the refrigerant plus absorbent solution in the solution tank 18. As the solution is heated, the refrigerant vaporizes and passes through the pipeline 50 at the top of the solution tank 18 and the absorbent solution is forced out of the fluid level pipeline 67 by pressure built up in the tank.

The absorbent plus refrigerant solution is pumped back into the solution tank 18 by the pump 78, and it enters the tank through the two ports at the top of the tank which, as shown in FIGURE 3, receives the pipeline 20 and its branch 24 respectively.

The level of the solution in the solution tank 18 is controlled in the described manner by the double float system 19. The float system 19 is adjusted to regulate the amount of absorbent plus refrigerant solution entering the tank 18 through each of the two inlet ports. The adjustment is such as to provide a constant flow of solution into the tank regardless of the position of the tank with respect to the horizontal. When the tank is horizontal, the float valve associated with each inlet port controls one-half the total flow of solution into the tank. When the tank is tilted 10 degrees from the horizontal, for example, one port is closed and the other fully open to allow full flow into the tank, as described above. At any angle between 0 and 15 degrees, the floats will balance each other in such a manner as to provide the desired flow into the tank at all times. This system provides for a constant level of solution in the tank 18 regardless of whether the vehicle is in an upgrade or downgrade position.

The function of the heat exchanger 68 is to increase the overall efficiency of the cycle by preheating the absorbent plus refrigerant solution entering the generator-muffler unit 10 and by cooling the absorbent solution on its way to the absorber 66.

The embodiment of the invention illustrated in FIGURE 8 is similar in some respects to the apparatus of FIGURE 1, and like components have been designated by the same reference numerals.

In the embodiment of FIGURE 8, the absorber 66, the evaporator 58 and the condenser 52 may be contained in separate compartments of a housing 100 for convenient handling and installation, these compartments being designated 102, 104 and 106 respectively.

The absorber compartment 102, which contains the absorber unit 66, will require openings to permit ambient air to circulate around the absorber unit. This compartment under some circumstances may require some forced air circulation to keep the absorber unit cool, and this circulation may be provided by an appropriate fan in the compartment. Alternately, a small portion of the cooling air from the evaporator compartment 104 may be circulated through the compartment 102 for this purpose.

The evaporator compartment 104 contains the expansion valve 60 and the evaporator unit 58, with its circulating fan 62. This compartment is insulated, and it is appropriately arranged to recirculate cooled air from an area to be cooled or to bring in outside air for cooling. The condenser compartment 106 contains the condenser 52, and its associated fan 54 which forces air circulation over the condenser unit.

The apparatus of FIGURE 8 is appropriate for use on vertically disposed exhaust pipe systems, and the generator-muffler unit 110 is somewhat different from the corresponding unit 10 of FIGURE 1. The electrically driven pump 78 illustrated in the system of FIGURE 1 is sometimes desirable in the system of FIGURE 8, and this pump and its drive motor 80 have been shown dotted in the latter figure. However, in systems where the absorber unit 66 can be located above the generator-muffler unit 110, the resultant static head created by the absorbent plus refrigerant solution in the absorber unit 66 is usually sufficient to permit the transfer of this solution into the generator-muffler unit 110 without the need for the pump 78.

The generator-muffler unit 110 of FIGURE 8 includes a housing 111 which, in turn, has a quantity of sound-absorbing material 112, such as fibre glass, contained in it. A vertically disposed inlet pipe 114 extends into the housing 112, this pipe being adapted to be coupled to the exhaust manifold of the motor vehicle. The inlet pipe 114 has a closed end, and it is perforated as in the previous embodiment. An imperforate portion of the pipe 114 extends through a solution tank 118 which is mounted within the housing 111.

The generator-muffler unit 110 also includes an exhaust pipe 116 which is positioned in spaced parallel relationship with the inlet pipe 114 and which extends vertically out of the housing 111. The exhaust pipe 116 also has a closed inner end, and it also has perforations to receive the hot gases from the inlet pipe 114. The exhaust pipe 116 also has an imperforate portion extending through the solution tank 118.

The absorbent plus refrigerant solution from the inlet lead 82 is introduced into the solution tank 118. A vertically extending vacuum lift tube 120 couples this tank with a separation chamber 122. The absorbent plus refrigerant solution upon being heated in the unit 110 is drawn up through the tube 120 into the separation chamber 122. The separation chamber has an inclined floor 124, and the outlet pipeline 67 extends from the chamber at the lowermost point of the floor 124. The absorbent solution moves down the floor 124 and is forced out the pipeline 67 by the vapor pressure in the separation chamber. The separated refrigerant vapor, on the other hand, moves up through the pipeline 50 to the condenser 52.

The invention provides, therefore, an improved and efficient absorbent type refrigeration system and apparatus, and improved components for use in such apparatus.

The generator-muffler component of the invention may be easily and simply installed in most motor vehicles merely by removing the existing muffler and interposing the muffler-generator unit. The unit is so constructed that it provides efficient heat transfer from the exhaust gases to the solution in its associated solution tank, and so that it also provides efficient and adequate muffling action for the hot gases.

The absorbent plus refrigerant solution introduced into the solution tank 18 is effectively controlled by the double valve system described above so that an essentially constant amount of solution may be maintained in the tank, regardless of the actual upgrade or downgrade position of the motor vehicle.

The absorber unit of the invention is efficient in its construction, and the inclusion of spray coils for the absorbent permits the intimate intermingling of the refrigerant with the absorbent for a full absorption of the refrigerant by the absorbent.

The invention is susceptible to various types of generator units, as shown in the illustrated embodiments. One unit is convenient for horizontal operation, and the other is appropriate for vertical operation, as described above.

We claim:

1. In refrigeration apparatus for use in conjunction with an engine having means for exhausting hot gases therefrom, the combination of: a muffler-generator unit including a housing, sound-absorbing material disposed within the housing, an inlet pipe for the muffler-generator unit extending into the housing adapted to be coupled to the exhaust means of the engine and including a perforated portion disposed within the housing for introducing hot exhaust gases into the housing, an outlet pipe for the muffler-generator unit extending into the housing including a perforated portion disposed within the housing in spaced relationship with the perforated portion of the inlet pipe for receiving the hot exhaust gases from the same, and a solution tank supported in the housing in heat-exchanging relationship with the hot gases passing from the inlet pipe to the outlet pipe; an absorber unit for providing a solution of an absorbent and a refrigerant for introduction to the solution tank, the refrigerant being vaporized out of the absorbent in the muffler-generator unit by the heat of the hot exhaust gases passing through said housing from the inlet pipe to the outlet pipe, the absorber unit including means for receiving the absorbent from the muffler-generator unit; a condenser unit for receiving the vaporized refrigerant from the muffler-generator unit and serving to at least partially condense the refrigerant; an evaporator unit; an expansion valve for introducing the refrigerant from the condenser unit to the evaporator unit; and means for feeding the refrigerant from the evaporator unit into the absorber unit to be mixed therein with the absorbent.

2. In refrigeration apparatus for use in conjunction with an engine having means for exhausting hot gases from the same, the combination of: a muffler-generator unit including an inlet pipe adapted to be coupled to the exhaust means of the engine, an outlet pipe, solution containing means disposed in heat-exchanging relationship with the hot exhaust gases passing from the inlet pipe to the outlet pipe, and a double float system mounted in the solution containing means for controlling the flow of solution into the containing means to provide for a substantially constant amount of solution in the containing means regardless of the inclination thereof; an absorber unit for providing a solution of an absorbent plus a refrigerant for introduction through the double float system into the solution containing means, the refrigerant being vaporized out of the absorbent in the muffler-generator unit by the heat of the hot gases passing from the inlet pipe to the outlet pipe, the absorber unit including means for receiving the absorbent from the muffler-generator unit; a condenser unit for receiving the vaporized refrigerant from the muffler-generator unit and serving to at least partially condense the refrigerant; an evaporator unit; an expansion valve for introducing the refrigerant from the condenser unit to the evaporator unit; and means for feeding the refrigerant from the evaporator unit into the absorber unit to be mixed therein with the absorbent.

3. In apparatus for use in a motor vehicle having an internal combustion engine with means for exhausting hot gases from the engine, the combination of: a muffler-generator unit including a housing, sound-absorbing material disposed within the housing, an inlet pipe for the muffler-generator unit adapted to be coupled to the exhausting means of the engine of the vehicle and including a horizontally-disposed closed-ended perforated portion within the housing for introducing hot exhaust gases into the housing, an outlet pipe for the muffler-generator unit including a horizontally-disposed closed-ended perforated portion within the housing in spaced parallel relationship with the perforated portion of the inlet pipe for receiving the hot exhaust gases from the same, and a solution tank supported in the housing in heat-exchanging relationship with the hot gases passing through the housing from the inlet pipe to the outlet pipe; an absorber unit for providing a solution of an absorbent and a refrigerant for introduction to the solution tank, the refrigerant being vaporized out of the absorbent in the solution tank by the heat of the hot exhaust gases passing through the housing from the inlet pipe to the outlet pipe, the absorber unit including means for receiving the absorbent from the solution tank; a condenser unit for receiving the vaporized refrigerant from the solution tank and serving to at least partially condense the refrigerant; an evaporator unit; an expansion valve for introducing the refrigerant from the condenser unit to the evaporator unit; and means for feeding the refrigerant from the evaporator unit into the absorber unit to be mixed therein with the absorbent.

4. In apparatus for use in a motor vehicle having an engine with means for exhausting hot gases from the engine, the combination of: a muffler-generator unit including a housing, sound-absorbing material disposed within the housing, an inlet pipe for the muffler-generator unit adapted to be coupled to the exhausting means of the engine and including a vertically-disposed closed ended perforated portion within the housing for introducing hot exhaust gases into the housing, an outlet pipe for the muffler-generator unit including a vertically-disposed closed-ended perforated portion within the housing in spaced parallel relationship with the perforated portion of the inlet pipe for receiving hot exhaust gases from the same, and a solution tank supported in the housing in heat-exchanging relationship with the hot gases passing through the housing from the inlet pipe to the outlet pipe, a separation chamber disposed above the solution tank, and a vacuum lift tube extending from the solution tank to the separation chamber; an absorber unit for providing a solution of an absorbent and a refrigerant for introduction to the solution tank; the solution being heated in the solution tank by the hot gases passing through the housing from the inlet pipe to the outlet pipe and the heated solution being drawn through the vacuum lift tube into the separation chamber in which the refrigerant is vaporized out of the absorbent, the absorber unit including means for receiving the absorbent from the separation chamber; a condenser unit for receiving the vaporized refrigerant from the separation chamber and serving to at least partially condense the refrigerant; an evaporator unit; an expansion valve for introducing the refrigerant from the condenser unit into the evaporator unit; and means for feeding the refrigerant from the evaporator unit into the absorber unit to be mixed therein with the absorbent.

5. The combination defined in claim 4 in which an imperforate portion of at least one portion of the inlet and outlet pipes passes through the solution tank.

6. In refrigeration apparatus for use on a motor vehicle having an internal combustion engine with means for exhausting hot gases from the engine, the combination of: a muffler-generator unit including a housing, sound-absorbing material disposed within the housing, a perforated inlet pipe extending into the housing and adapted to be coupled to the exhausting means of the engine, a perforated outlet pipe extending out of the housing and spaced from the inlet pipe and adapted to receive the hot gases introduced into the housing through the perforations in the inlet pipe, a solution tank supported in the housing in heat-exhanging relationship with the hot gases passing from the inlet pipe to the outlet pipe, and a double float system mounted in the solution tank for controlling the flow of solution into the tank to provide for a substantially constant amount of solution in the tank regardless of the inclination thereof; an absorber unit for providing a solution of an absorbent and a refrigerant for introduction through the double float system into the solution tank, the refrigerant being vaporized out of the absorbent in the muffler-generator unit by the heat of the hot gases passing through said housing from the inlet pipe to the outlet pipe, the absorber unit including spray coils for receiving the absorbent from the muffler-generator unit and for introducing the absorbent into the interior of the absorber unit in a spray form; a condenser unit for receiving the vaporized refrigerant from the muffler-generator unit and serving to at least partially condense the refrigerant; an evaporator unit; an expansion valve for introducing the refrigerant from the condenser unit to the evaporator unit; and means for feeding the refrigerant from the evaporator unit into the absorber unit to be intimately mixed with the absorbent spray from the spray coils therein.

7. In refrigeration apparatus for use with an internal combustion engine having means for exhausting hot gases therefrom, the combination of: a muffler-generator unit including a housing, sound-absorbing material disposed within the housing, an inlet pipe for the muffler-generator unit extending into the housing and adapted to be coupled to the exhausting means of the engine and including a perforated portion disposed within the housing for introducing hot gases into the housing, an outlet pipe for the muffler-generator unit extending into the housing including a perforated portion disposed within the housing in spaced relationship with the perforated portion of the inlet pipe for receiving the hot exhaust gases from the same, and a solution tank supported in the housing in heat exchanging relationship with the hot gases passing from the inlet pipe to the outlet pipe.

8. In refrigeration apparatus for use on a motor vehicle having an internal combustion engine with means for exhausting hot gases from the engine, the combination of: a muffler-generator unit including an inlet pipe adapted to be coupled to the exhausting means of the engine, an outlet pipe, a solution tank disposed in heat-exchanging relationship with the hot gases passing from the inlet pipe to the outlet pipe, and a double float system mounted in the solution tank for controlling the flow of solution into the tank to provide for a substantially constant amount of solution in the tank regardless of the inclination thereof.

9. In refrigerating apparatus for use on a motor vehicle having an internal combustion engine with means for exhausting hot gases from the engine, the combination of: a muffler-generator unit including an inlet pipe adapted to be coupled to the exhausting means of the engine, an outlet pipe, a solution container disposed in heat-exchanging relationship with the hot exhaust gases passing from the inlet pipe to the outlet pipe, a plurality of inlet ports for introducing a solution into the solution container, and individual means including a float associated with each of the inlet ports to regulate the amount of solution entering the solution container so as to provide a substantially constant amount of solution in the container regardless of the inclination thereof.

10. In apparatus for use on a motor vehicle having an internal combustion engine with means for exhausting hot gases from the engine, the combination of: a muffler-generator unit including a housing, a sound-absorbing material disposed within the housing, an inlet pipe for the muffler-generator unit adapted to be coupled to the exhausting means of the engine and including a closed-ended perforated portion within the housing for introducing hot exhaust gases into the housing, an outlet pipe for the muffler-generator unit including a closed-ended perforated portion within the housing in spaced parallel relationship with the perforated portion of the inlet pipe for receiving hot exhaust gases from the same, a solution tank for a refrigerant and absorbent solution supported in the housing in heat-exchanging relationship with the hot gases passing from the inlet pipe to the outlet pipe, a separation chamber disposed above the solution tank, and a vacuum lift tube extending from the solution tank to the separation chamber, the solution in the solution tank being heated by the hot gases passing from the inlet pipe to the outlet pipe and being drawn up through the vacuum lift tube into the separation chamber in which refrigerant is vaporized out of the absorbent.

References Cited in the file of this patent

UNITED STATES PATENTS

| | | |
|---|---|---|
| 1,933,360 | Barbarou | Oct. 31, 1933 |
| 1,983,056 | Teichman | Dec. 4, 1934 |
| 2,115,128 | Starkweather | Apr. 26, 1938 |
| 2,192,367 | Prince | Mar. 5, 1940 |
| 2,196,920 | Hoyle | Apr. 9, 1940 |
| 2,399,916 | Edberg | May 7, 1946 |
| 2,592,712 | Knoy | Apr. 15, 1952 |
| 2,625,803 | Simpson | Jan. 20, 1953 |
| 2,783,622 | Bourassa | Mar. 5, 1957 |
| 2,840,997 | Leonard | July 1, 1958 |